United States Patent
Kodama

(10) Patent No.: US 7,773,477 B2
(45) Date of Patent: Aug. 10, 2010

(54) OPTICAL DISK DRIVING UNIT, PICKUP CONTROLLER, AND LASER DRIVER PROVIDED IN A PICKUP

(75) Inventor: Kunihiko Kodama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1186 days.

(21) Appl. No.: 11/001,018

(22) Filed: Dec. 2, 2004

(65) Prior Publication Data

US 2005/0163020 A1 Jul. 28, 2005

(30) Foreign Application Priority Data

Dec. 5, 2003 (JP) ............................... 2003-407495

(51) Int. Cl.
*G11B 7/00* (2006.01)
(52) U.S. Cl. .................. 369/59.11; 369/116; 369/47.52
(58) Field of Classification Search ........................ None
See application file for complete search history.

(56) References Cited

U.S. PATENT DOCUMENTS 6,483,791 B1 * 11/2002 Asada et al. .............. 369/47.53
2003/0112732 A1 6/2003 Masui et al.
2004/0179444 A1 9/2004 Hikimura et al.
2005/0013233 A1 * 1/2005 Chou et al. .............. 369/47.53
2005/0265155 A1 * 12/2005 Iwano et al. ................ 369/47.1

FOREIGN PATENT DOCUMENTS

| JP | 06-068510 | | 3/1994 |
| JP | 06068510 | * | 3/1994 |
| JP | 11-219524 | | 8/1999 |
| JP | 2002-133674 | | 5/2002 |
| JP | 2002-279675 | | 9/2002 |
| JP | 2005-038571 | | 2/2005 |

* cited by examiner

Primary Examiner—Jorge L Ortiz Criado
(74) Attorney, Agent, or Firm—Oblon, Spivak, McClelland, Maier & Neustadt, L.L.P.

(57) ABSTRACT

An optical disk driving unit includes a pickup configured to supply a drive current to a laser unit, and to irradiate a laser beam to an optical disk. A plurality of signal lines are configured to transmit control information of the drive current to the pickup. A pickup controller is configured to control operation of the pickup by transferring control data to the pickup via the signal lines when the drive current is a constant value.

2 Claims, 18 Drawing Sheets

FIG. 4
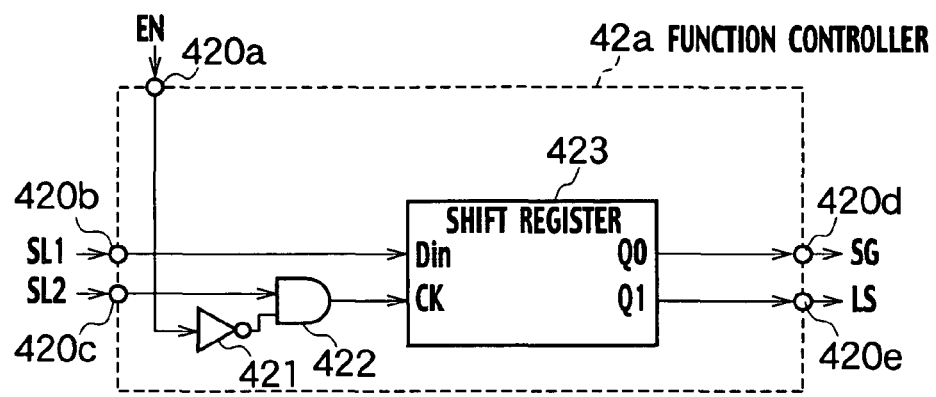
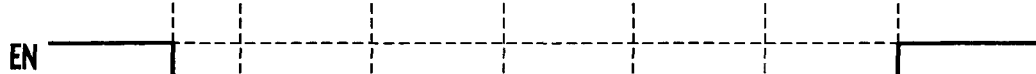
FIG.5A  EN
FIG.5B  SL1
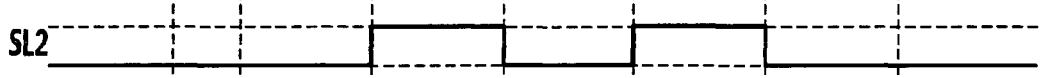
FIG.5C  SL2
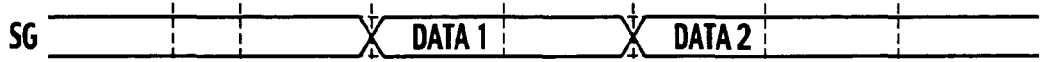
FIG.5D  SG
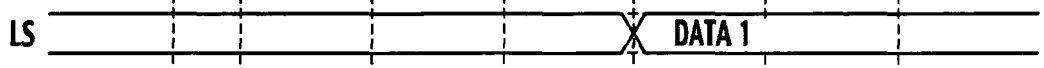
FIG.5E  LS

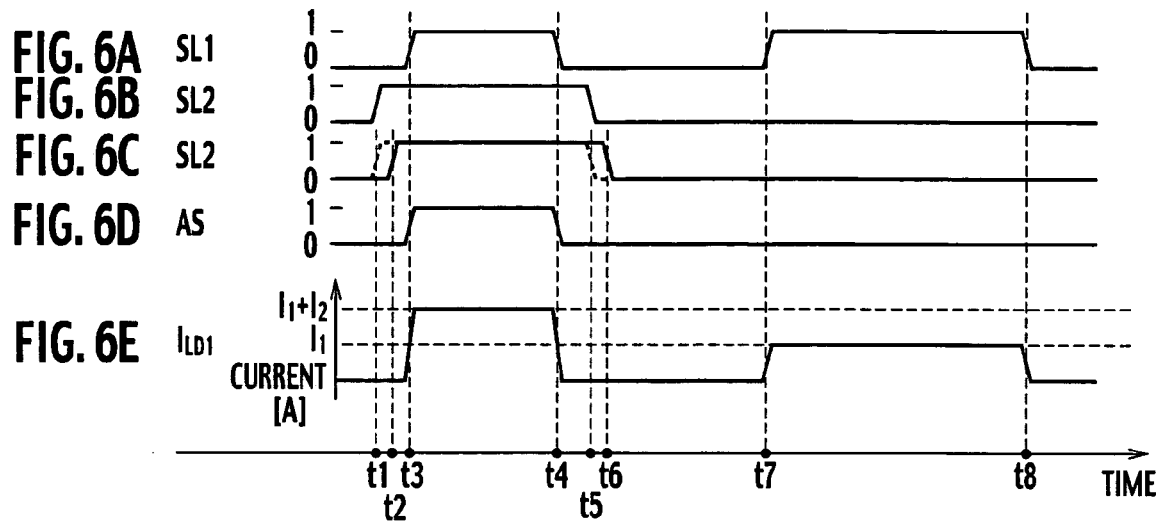
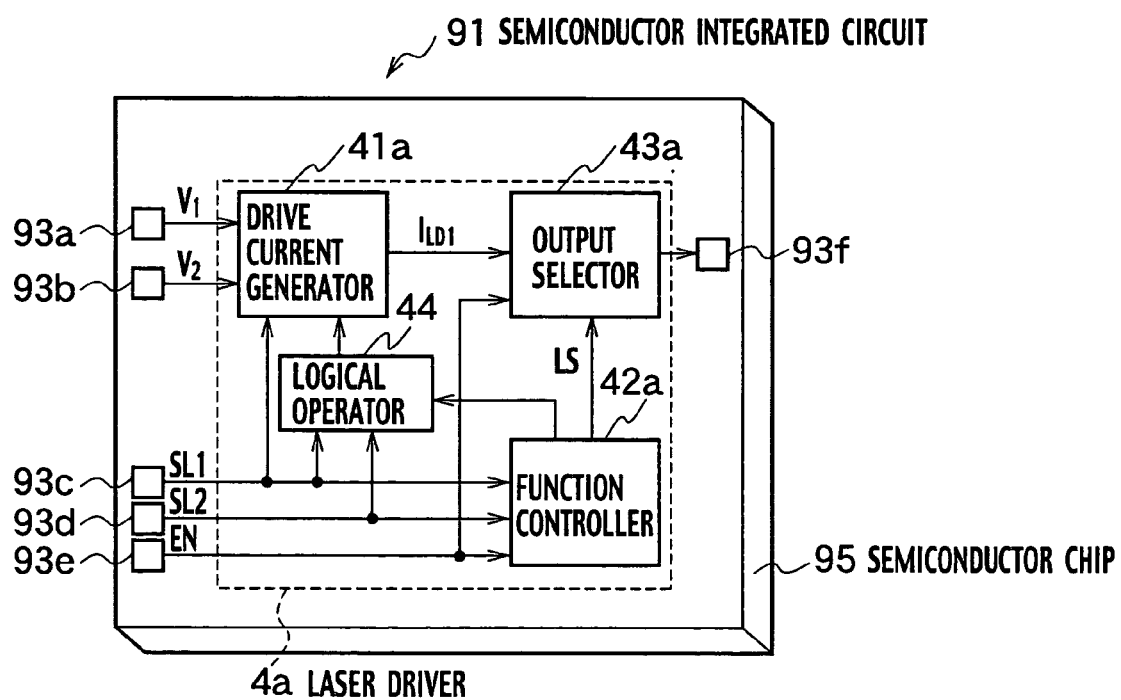

FIG. 15
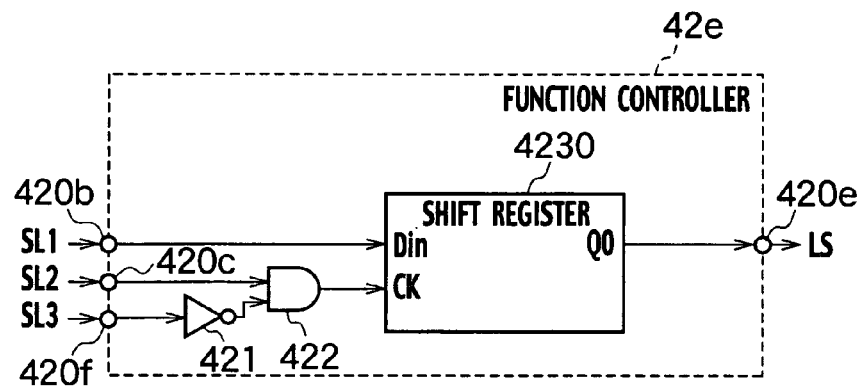
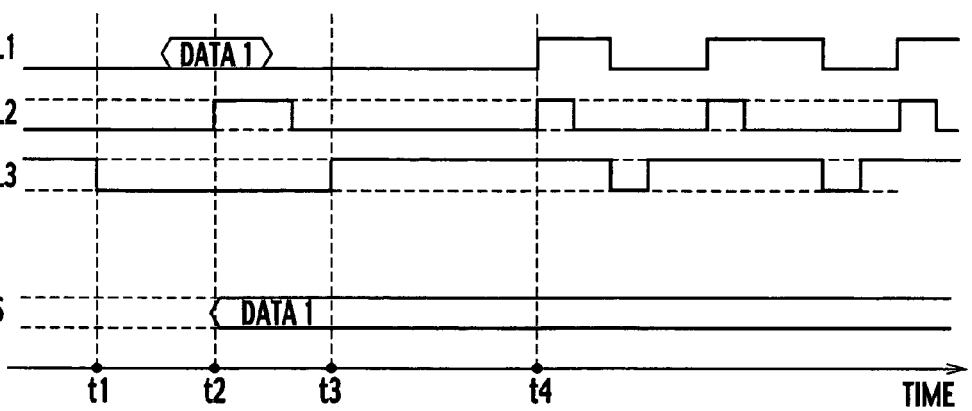

OPTICAL DISK DRIVING UNIT, PICKUP CONTROLLER, AND LASER DRIVER PROVIDED IN A PICKUP

CROSS REFERENCE TO RELATED APPLICATIONS AND INCORPORATED BY REFERENCE

This application is based upon and claims the benefit of priority from the prior Japanese Patent Applications No. P2003-407495, filed on Dec. 5, 2003; the entire contents of which are incorporated herein by reference.

BACKGROUND OF THE INVENTION

1. Field of the Invention

The present invention relates to an optical disk driving unit and, more particularly, to a pickup controller for controlling a pickup of the optical disk driving unit. A laser driver is provided in the pickup.

2. Description of the Related Art

A pickup for irradiating a laser beam to an optical disk includes a laser driver for supplying a drive current to a laser unit. Due to an increase in recording capacity of an optical disk, recent technology has advanced to develop multi-intensity recording lasers, as well as a more highly precise architecture for adjusting the pulse width of recording lasers. An optical disk driving unit includes a pickup, and a printed circuit board provided with circuits such as controllers. A technique for mounting a laser driver inside of the pickup, and mounting a controller on the circuit board has been proposed. Since the pickup is able to repeatedly shift back and forth within the inner and the outer peripheries of the dish, the pickup is connected to the printed circuit board by a flexible-cable.

Functions of the pickup have increased because of increases in recording capacity and recording speed, and diversification of the recording medium. A pickup having functions such as using a plurality of lasers in accordance with the recording medium, forcibly turning off the drive current, and increasing the gain of the drive current for high-speed recording, has been developed.

In the foregoing related art, securing a plurality of signal lines for controlling the functions in the pickup is necessary because of the increases in the functions of the pickup. That is, a signal line for selecting the lasers in accordance with the recording medium, a signal line for forcibly turning off the drive current, and a signal line for increasing the gain of the drive current for high-speed recording must be provided in the flexible cable. As a result, since the number of signal lines increases, there is an increase in the implementation area and a decrease in reliability of connectors connected to the flexible cable.

SUMMARY OF THE INVENTION

An aspect of the present invention inheres in an optical disk driving unit encompassing, a pickup configured to supply a drive current to a laser unit, which irradiates a laser beam to an optical disk, a plurality of signal lines configured to transmit control information of the drive current to the pickup, and a pickup controller configured to control operation of the pickup by transferring control data to the pickup via the signal lines when the drive current is a constant value.

Another aspect of the present invention inheres in a pickup controller encompassing, a signal generator configured to generate a plurality of current setting signals and a plurality of waveform control signals to generate a drive current of a laser unit in a pickup, a control data generator configured to generate a control data to control functions of the pickup, and a select signal generator configured to transfer the control data to the pickup via a plurality of signal lines when the pickup is in one of a stand-by mode and a reproduction mode, and to transfer the current setting signals and the waveform control signals to the pickup via the signal lines when a recording mode.

Still another aspect of the present invention inheres in a laser driver provided in a pickup comprising, a function controller configured to receive control data when the pickup is in one of a stand-by mode and a reproduction mode, and to generate a laser select signal to select one of a plurality of laser diodes in the pickup, a drive current generator configured to receive a plurality of current setting signals and a plurality of waveform control signals, and to generate a drive current for the laser diodes based on the current setting signals and the waveform control signals, and an output selector configured to supply the drive current to one of the laser diodes in accordance with the laser select signal.

BRIEF DESCRIPTION OF THE DRAWINGS

FIG. 4 is a block diagram showing a function controller according to the first embodiment;

FIGS. 5A to 5E are time charts showing the operation of the laser controller according to the first embodiment;

FIGS. 6A to 6E are time charts showing the operation of the laser controller according to the first embodiment;

FIG. 7 is a schematic diagram showing a semiconductor integrated circuit according to the first embodiment;

FIG. 15 is a block diagram showing a function controller according to the second embodiment;

FIGS. 16A to 16D are time charts showing the operation of the laser controller according to the second embodiment;

DETAILED DESCRIPTION OF THE INVENTION

Figure 1:
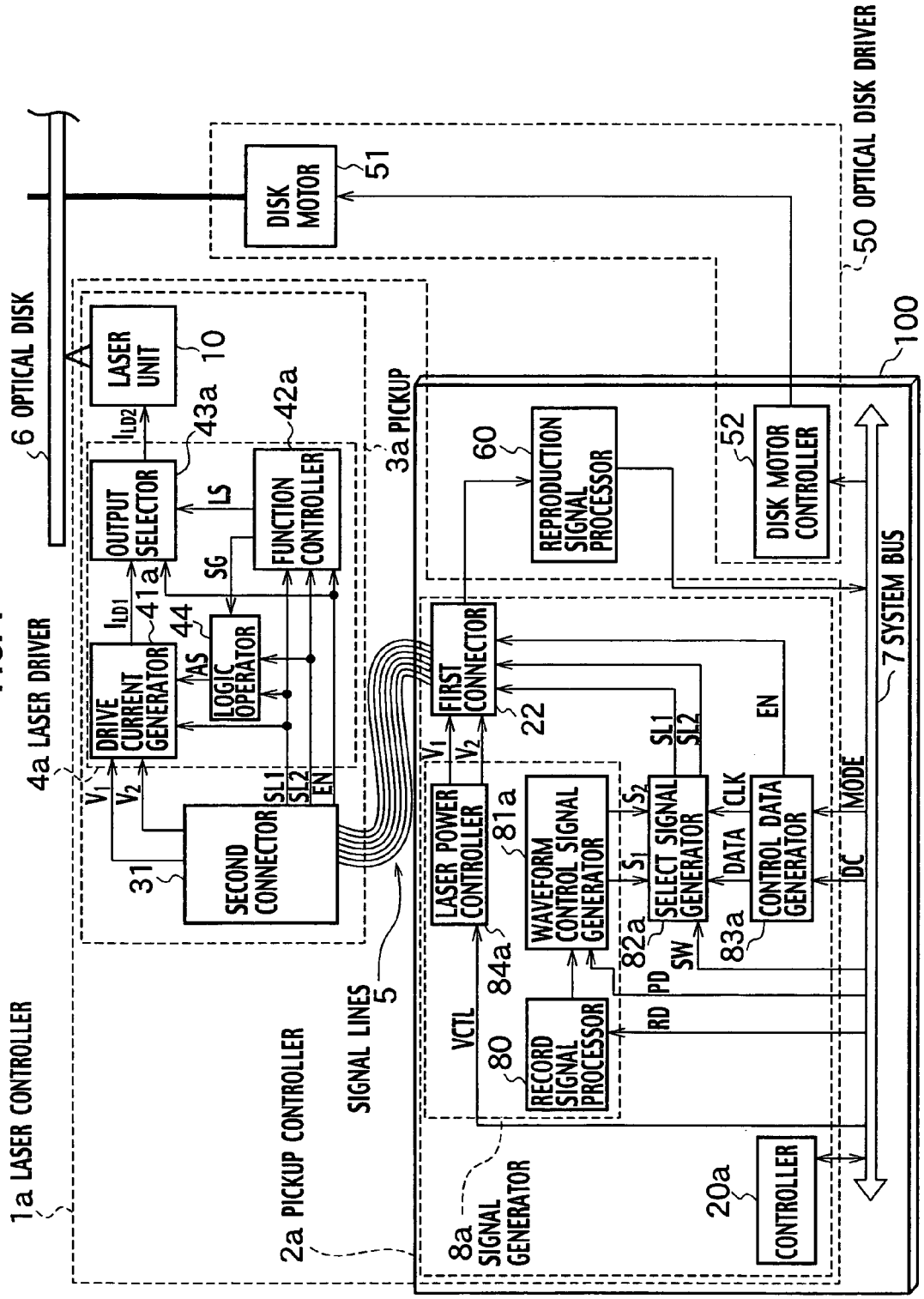
FIG. 1 is a schematic diagram showing an optical disk driving unit according to a first embodiment of the present invention.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail. In the following description, the words "connect" or "connected" defines a state in which first and second elements are electrically connected to each other without regard to whether or not there is a physical connection between the elements.

First Embodiment

As shown in FIG. 1, an optical disk driving unit according to a first embodiment of the present invention includes an optical disk 6, a system bus 7, a laser controller 1a configured to control a laser beam for irradiating the beam to the optical disk 6, an optical disk driver 50 configured to drive the optical disk 6, and a reproduction signal processor 60 configured to generate a reproduction signal based on a signal read out from the optical disk 6. The laser controller 1a includes a pickup 3a, a plurality of signal lines 5, and a pickup controller 2a. The pickup 3a supplies a drive current $I_{LD2}$ to a laser unit 10, which irradiates the laser beam to the optical disk 6. The signal lines 5 transmit the control information of the drive current $I_{LD2}$ to the pickup 3a. The pickup controller 2a transfers the control data DATA for controlling functions of the pickup 3a to the pickup 3a via the signal lines 5 when the drive current $I_{LD2}$ is a constant value. The signal lines 5 are provided in the flexible cable. Here, "when the drive current $I_{LD2}$ is a constant value" refers to a stand-by mode and a reproduction mode of the optical disk driving unit. Furthermore, "functions of the pickup 3a" refers to functions such as selection of laser diodes for irradiating the laser beam in accordance with the kind of optical disk 6, and selection of logic operations performed in the pickup 3a.

The pickup controller 2a supplies a plurality of current setting signals $V_1, V_2, \ldots$ and a plurality of waveform control signals $S_1, S_2, \ldots$ for generating the drive current $I_{LD2}$ as the control information of the drive current $I_{LD2}$ to the pickup 3a in a recording mode. Although the drive current $I_{LD2}$ is kept to a constant value when in the stand-by mode and the reproduction mode, the drive current $I_{LD2}$ assumes a pulse shaped when in the recording mode.

The optical disk driver 50 includes a disk motor 51 configured to drive the optical disk 6, and a disk motor controller 52 configured to control the disk motor 51. The pickup controller 2a, the reproduction signal processor 60, the disk motor controller 52, and the system bus 7 are mounted on the printed circuit board 100. A pickup drive mechanism that moves parallel to a recording surface of the optical disk 6 is not illustrated in FIG. 1.

Furthermore, the pickup controller 2a includes a first connector 22, a controller 20a, a signal generator 8a, a select signal generator 82a, and a control data generator 83a. The first connector 22 is connected to the signal lines 5. The controller 20a and the control data generator 83a are connected to the system bus 7. The signal generator 8a has an input connected to the system bus 7, and an output connected to the first connector 22 and the select signal generator 82a. The select signal generator 82a has an input connected to the system bus 7, the signal generator 8a, and the control data generator 83a, and an output connected to the first connector 22.

The signal generator 8a generates a first current setting signal $V_1$ and a second current setting signal $V_2$. The signal generator 8a generates a first waveform control signal $S_1$, and a second waveform control signal $S_2$ for masking the first waveform control signal $S_1$. The control data generator 83a generates the control data DATA, a data transfer clock CLK, and an output enable signal EN for indicating generation of the drive current $I_{LD2}$, based on a data control signal DC and an output control signal MODE transmitted from the controller 20a via the system bus 7. The select signal generator 82a selects one of the first waveform control signal $S_1$ and the control data DATA as a first select signal SL1, and selects one of the second waveform control signal $S_2$ and the data transfer clock CLK as a second select signal SL2, based on a switch signal SW transmitted from the controller 20a via the system bus 7. The controller 20a controls the operation timing of the signal generator 8a, the select signal generator 82a, and the control data generator 83a, and the like.

The signal generator 8a includes a laser power controller 84a, a record signal processor 80, and a waveform control signal generator 81a. The laser power controller 84a is connected between the system bus 7 and first connector 22. The record signal processor 80 has an input connected to the system bus 7. The waveform control signal generator 81a has an input connected to the record signal processor 80 and the system bus 7, and an output connected to the select signal generator 82a. The record signal processor 80 modulates record signal RD transmitted from the controller 20a via the system bus 7. The waveform control signal generator 81a generates a first waveform control signal $S_1$ and a second waveform control signal $S_2$ based on a preset signal PD and the modulated record signal RD transmitted from the controller 20a via the system bus 7. The laser power controller 84a generates a first current setting signal $V_1$ and a second current setting signal $V_2$ in accordance with a voltage control signal VCTL transmitted from the controller 20a via the system bus 7.

Figure 2:
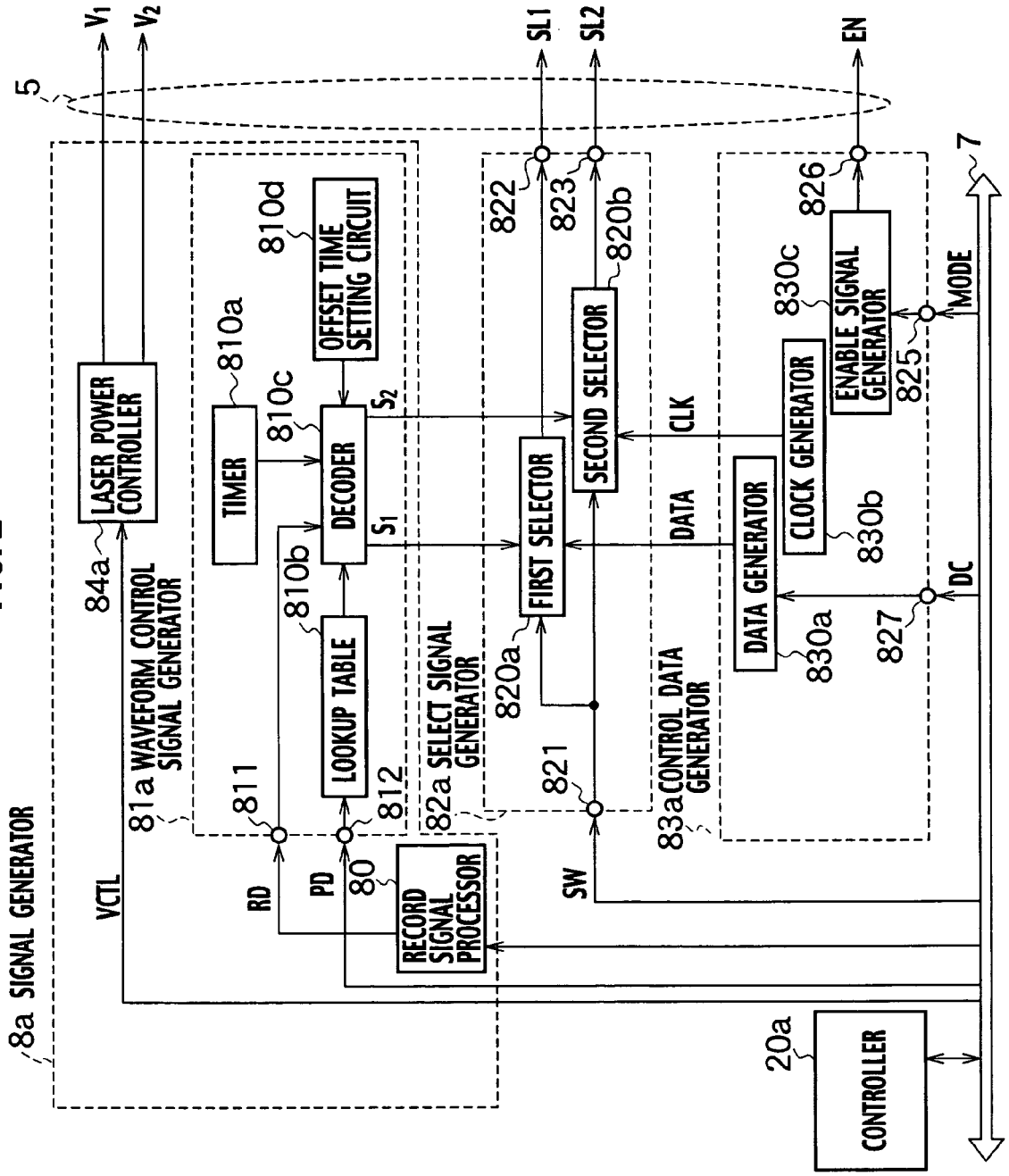
FIG. 2 is a block diagram showing a signal generator, a select signal generator, and a control data generator according to the first embodiment.

As shown in FIG. 2, the waveform control signal generator 81a includes a record data input terminal 811, a preset signal input terminal 812, a timer 810a, a lookup table 810b, a decoder 810c, and an offset time setting circuit 810d. The lookup table 810b has an input connected to the preset signal input terminal 812. The decoder 810c has an input connected to the timer 810a, the lookup table 810b, the decoder 810c, and the offset time setting circuit 810d. In FIG. 2, the first connector 22 shown in FIG. 1 is not illustrated.

The timer 810a generates the time information. The lookup table 810b generates a timing control signal for performing fine adjustment to the leading timing and trailing timing of first waveform control signal $S_1$ and second waveform control signal $S_2$ based on the preset signal PD. The offset time setting circuit 810d generates an offset control signal for controlling high-level periods of the second waveform control signal $S_2$. The offset time setting circuit 810d sets leading edges of the second waveform control signal $S_2$ before the leading edges of the first waveform control signal $S_1$. Alternatively, the offset time setting circuit 810d sets trailing edges of the second waveform control signal behind the trailing edges of the first waveform control signal $S_1$. The decoder 810c generates the first waveform control signal $S_1$ and the second waveform control signal $S_2$ based on the modulated record signal RD, the time information from the timer 810a, the timing control signal from the lookup table 810b, and the offset control signal from the offset time setting circuit 810d.

Furthermore, the control data generator 83a includes a data control signal input terminal 827, an output control signal input terminal 825, an enable signal output terminal 826, a data generator 830a, a clock generator 830b, and an enable signal generator 830c. The data generator 830a is connected to the data control signal input terminal 827. The enable signal generator 830c is connected between the output control signal input terminal 825 and enable signal output terminal 826. The data generator 830a generates the control data DATA in accordance with the data control signal DC. The clock generator 830b generates the data transfer clock CLK. The enable signal generator 830c generates the output enable signal EN in accordance with the output control signal MODE.

The select signal generator 82a includes an operation switch signal input terminal 821, a first select signal output terminal 822, a second select signal output terminal 823, a first selector 820a, and a second selector 820b. The first selector 820a has an input connected to the decoder 810c, the operation switch signal input terminal 821, and the data generator 830a, and an output connected to the first select signal output terminal 822. The second selector 820b has an input connected to the decoder 810c, the operation switch signal input terminal 821, and the clock generator 830b, and an output connected to the second select signal output terminal 823. The first selector 820a generates the first select signal SL1 by selecting one of the first waveform control signal $S_1$ and the control data DATA in accordance with the operation switch signal SW. The second selector 820b generates the second select signal SL2 by selecting one of the second waveform control signal $S_2$ and the data transfer clock CLK in accordance with the operation switch signal SW.

As shown in FIG. 1, the pickup 3a includes a second connector 31 connected to the signal lines 5, a laser driver 4a connected to the second connector 31, and a laser unit 10 connected to the laser driver 4a. The laser driver 4a generates the drive current $I_{LD2}$ based on the first current setting signal $V_1$, the second current setting signal $V_2$, the first select signal SL1, the second select signal SL2, and the output enable signal EN. The laser unit 10 irradiates the laser beam to the optical disk 6 in accordance with the drive current $I_{LD2}$.

Figure 3:
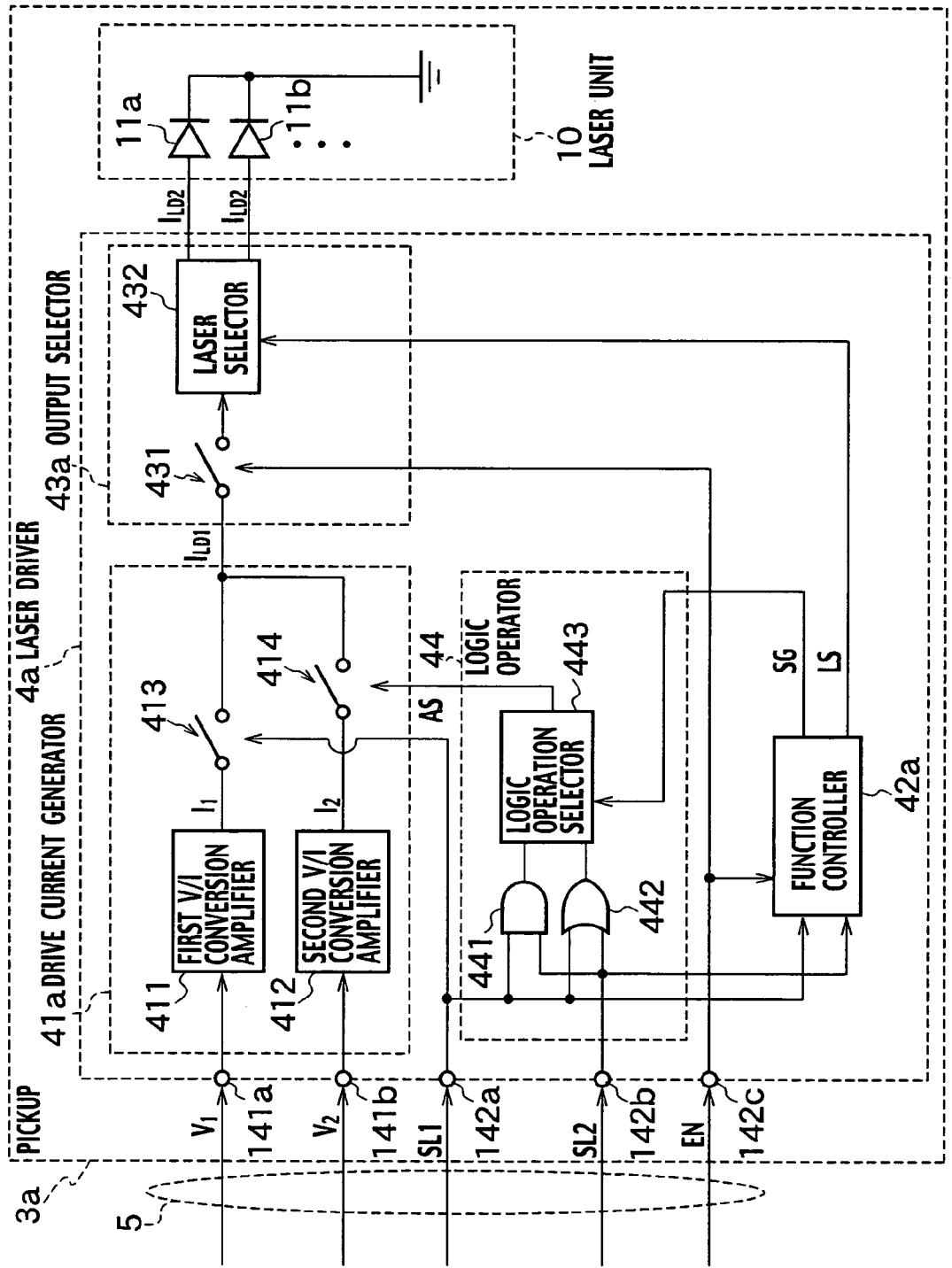
FIG. 3 is a block diagram showing a laser driver according to the first embodiment.

As shown in FIG. 3, the laser unit 10 includes a plurality of laser diodes 11a, 11b, ... having anodes connected to the laser driver 4a, and cathodes connected to a ground VSS. The laser driver 4a includes a first current setting signal terminal 141a, a second current setting signal terminal 141b, a first select signal terminal 142a, a second select signal terminal 142b, an enable signal terminal 142c, a function controller 42a, a logic operator 44, a drive current generator 41a, and an output selector 43a.

The function controller 42a has an input connected to the first select signal terminal 142a, the second select signal terminal 142b, and the enable signal terminal 142c. The logic operator 44 has an input connected to the first select signal terminal 142a, the second select signal terminal 142b, and the function controller 42a. The drive current generator 41a has an input connected to the first current setting signal terminal 141a, the second current setting signal terminal 141b, the first select signal terminal 142a, and the logic operator 44. The output selector 43a has an input connected to the enable signal terminal 142c, the function controller 42a, and the drive current generator 41a, and an output connected to the laser unit 10. In FIG. 3, the second connector 31 shown in FIG. 1 is not illustrated.

The function controller 42a generates a logic operation select signal SG and a laser select signal LS based on the first select signal SL1, the second select signal SL2, and the output enable signal EN. The logic operator 44 executes an AND operation or an OR operation to the first select signal SL1 and the second select signal SL2 in accordance with the logic operation select signal SG, and generates an operation output signal AS. The drive current generator 41a generates a drive current $I_{LD1}$ based on the first current setting signal $V_1$, the second current setting signal $V_2$, the first select signal SL1, and the operation output signal AS. The output selector 43a switches supplying the drive current $I_{LD2}$ to the laser diodes 11a, 11b, ... in accordance with the output enable signal EN. The output selector 43a supplies the drive current $I_{LD2}$ to one of the laser diodes 11a, 11b, ... in accordance with the laser select signal LS.

The drive current generator 41a includes a first voltage/current (V/I) conversion amplifier 411, a second V/I conversion amplifier 412, a first switch 413, and a second switch 414. The first V/I conversion amplifier 411 has an input connected to the first current setting signal terminal 141a. The second V/I conversion amplifier 412 has an input connected to the second current setting signal terminal 141b. The first switch 413 has an input connected to the first select signal terminal 142a and the first V/I conversion amplifier 411, and an output connected to the output selector 43a. The second switch 414 has an input connected to the second V/I conversion amplifier 412 and the logic operator 44, and an output connected to the output selector 43a.

The first V/I conversion amplifier 411 converts the first current setting signal $V_1$ into the first current $I_1$. The second V/I conversion amplifier 412 converts the second current setting signal $V_2$ into the second current $I_2$. The first switch 413 switches supply of the first current $I_1$ to the output selector 43a in accordance with the first select signal SL1. The second switch 414 switches supply of the second current $I_2$ to the output selector 43a in accordance with the operation output signal AS.

The logic operator 44 includes a mask operating AND circuit 441, a mask operating OR circuit 442, and a logic operation selector 443. The mask operating AND circuit 441 has an input connected to the first select signal terminal 142a and the second select signal terminal 142b. The mask operating OR circuit 442 has an input connected to the first select signal terminal 142a and the second select signal terminal 142b. The logic operation selector 443 has an input connected to the mask operating AND circuit 441, the mask operating OR circuit 442, and the function controller 42a, and an output connected to the second switch 414.

The mask operating AND circuit 441 executes an AND operation to the first select signal SL1 and the second select signal SL2. The mask operating OR circuit 442 executes an OR operation to the first select signal SL1 and the second select signal SL2. The logic operation selector 443 selects one of an output signal of the mask operating AND circuit 441 and an output signal of the mask operating OR circuit 442 as the operation output signal AS in accordance with the logic operation select signal SG.

The output selector 43a includes an output switch 431 and a laser selector 432. The output switch 431 has an input connected to the first switch 413, the second switch 414, and the enable signal terminal 142c. The laser selector 432 has an input connected to the output switch 431 and the function controller 42a, and an output connected to the laser diodes 11a, 11b, . . . . The output switch 431 switches supply of the drive current $I_{LD2}$ based on the output enable signal EN. The laser selector 432 supplies the drive current $I_{LD2}$ to one of the laser diodes 11a, 11b, . . . based on the laser select signal LS.

As shown in FIG. 4, the function controller 42a includes a first input terminal 420a, a second input terminal 420b, a third input terminal 420c, a first output terminal 420d, a second output terminal 420e, a function controlling inverter 421, a function controlling AND circuit 422, and a shift register 423. The function controlling inverter 421 has an input connected to the first input terminal 420a. The function controlling AND circuit 422 has an input connected to the third input terminal 420c and the function controlling inverter 421. The shift register 423 has a data input terminal Din connected to the second input terminal 420b, a clock terminal CK connected to the function controlling AND circuit 422, a first data output terminal Q0 connected to the first output terminal 420d, and a second data output terminal Q1 connected to the second output terminal 420e.

The function controlling inverter 421 inverts the output enable signal EN. The function controlling AND circuit 422 executes an AND operation to the second select signal SL2 and the inverted output enable signal EN. As a result, the second select signal SL2 is not supplied to the clock terminal CK of the shift register 423 when the output enable signal EN is a high level signal. The shift register 423 shifts the first select signal SL1 in synchronization with the output signal of the function controlling AND circuit 422, and generates the logic operation select signal SG and the laser select signal LS.

Next, the operation of the laser controller 1a according to the first embodiment of the present invention will be described referring to FIGS. 1 to 6E.

(A) At time t1 of FIG. 5A, the enable signal generator 830c shown in FIG. 2 generates a low level output enable signal EN in accordance with the output control signal MODE. The output enable signal EN is transmitted to the function controller 42a and the output switch 431 shown in FIG. 3. The output switch 431 is turned off by the output enable signal EN. Therefore, the current value of the drive current $I_{LD2}$ is kept constant, i.e. about 0[A]. During a period of time t1 to t2 of FIG. 5B, the data generator 830a shown in FIG. 2 supplies the control data DATA to the first selector 820a. The clock generator 830b supplies the data transfer clock CLK to the second selector 820b.

(B) At time t2 of FIG. 5B, the first selector 820a selects the control data DATA as the first select signal SL1 in accordance with the operation switch signal SW. At time t2 of FIG. 5C, the second selector 820b selects data transfer clock CLK as the second select signal SL2 in accordance with the operation switch signal SW. The first select signal SL1 is transmitted to the mask operating AND circuit 441, the mask operating OR circuit 442, the function controller 42a, and the first switch 413 shown in FIG. 3. The second select signal SL2 is transmitted to the mask operating AND circuit 441, the mask operating OR circuit 442, and the function controller 42a.

(C) The function controlling inverter 421 shown in FIG. 4 inverts the low level output enable signal EN. The function controlling AND circuit 422 executes the AND operation to the second select signal SL2 and the output enable signal EN. The shift register 423 takes in the first select signal SL1 in synchronization with the output signal of function controlling AND circuit 422. As a result, the logic operation select signal SG is generated in synchronization with the leading edge of second select signal SL2 as shown in time t3 of FIG. 5C and FIG. 5E. The laser select signal LS is generated in synchronization with the leading edge of the second select signal SL2 as shown in time t5 of FIG. 5C and FIG. 5E.

(D) For example, the logic operation selector 443 shown in FIG. 3 selects an output signal of the mask operating AND circuit 441 as the operation output signal AS based on the logic operation select signal SG. The laser selector 432 selects one of laser diodes 11a, 11b, . . . based on the laser select signal LS. Furthermore, the enable signal generator 830c shown in FIG. 2 sets the output enable signal EN to a high level at time t7 of FIG. 5A. When the output enable signal EN is set to a high level, the output switch 431 shown in FIG. 3 goes to an on state. The pickup 3a traces the optical disk 6, and searches for a recording start position in periods from time t7 of FIG. 5.

(E) As shown in FIG. 6A, the first selector 820a shown in FIG. 2 selects the first waveform control signal $S_1$ from the decoder 810c as the first select signal SL1. As shown in FIG. 6B, second selector 820b selects the second waveform control signal $S_2$ from the decoder 810c as the second select signal SL2. The laser power controller 84a generates the first current setting signal $V_1$ and the second current setting signal $V_2$ in accordance with the voltage control signal VCTL. The first current setting signal $V_1$ and the second current setting signal $V_2$ are transmitted to the first V/I conversion amplifier 411 and the second V/I conversion amplifier 412 shown in FIG. 3, respectively. As a result, the first current $I_1$ and the second current $I_2$ are generated.

(F) The first select signal SL1 and the second select signal SL2 are transmitted to the pickup 3a via the signal lines 5. As shown in FIG. 6C, signal delays occurred in periods of time t1 to t2 and t5 to t6 when the second waveform control signal $S_2$ passes though the signal lines 5. The mask operating AND circuit 441 shown in FIG. 3 executes an AND operation to the first select signal SL1 and the second select signal SL2. As a result, the operation output signal AS shown in FIG. 6D is generated. The first select signal SL1 is transmitted to the first switch 413. The operation output signal AS is transmitted to the second switch 414.

(G) The first switch 413 is turned on in the high level periods of the first select signal SL1, i.e., the periods of time t3 to t4 and t7 to t8 of FIG. 6. On the other hand, the second switch 414 is turned on in the high level periods of the operation output signal AS, i.e., the period of time t3 to t4 of FIG. 6. As a result, the current value of the drive current $I_{LD2}$ becomes equal to the sum of each current value of the first current $I_1$ and the second current $I_2$ in period of time t3 to t4 as shown in FIG. 6E. The current value of the drive current $I_{LD2}$ becomes equal to the first current $I_1$ in period of time t7 to t8. Therefore, the waveform of the drive current $I_{LD2}$ is pulse-shaped in the recording mode.

As described above, the control data DATA and the data transfer clock CLK are supplied to the pickup 3a as the first select signal SL1 and the second select signal SL2 in a period of time t1 to t7 of FIG. 5, i.e., the stand-by mode of the optical disk driving unit. Since it is possible to set the functions of the pickup 3a in stand-by mode, it is not necessary to add exclusive signal lines in the flexible-cable for controlling the functions. Therefore, it is possible to deal with the increase in functions of pickup 3a without increasing the number of the signal lines 5 in the flexible-cable. On the other hand, in the recording mode, the first waveform control signal $S_1$ and the second waveform control signal $S_2$ for masking the first waveform control signal $S_1$ are supplied to the pickup 3a as the first select signal SL1 and the second select signal SL2. Even if signal delays occur in the signal lines 5 in the recording mode, waveform distortions do not occur in the drive current $I_{LD2}$. Consequently, it is possible to carry out the recording with high reliability.

The laser driver 4a shown in FIG. 1 can be monolithically integrated onto a single semiconductor chip 95, as shown in FIG. 7, and a semiconductor integrated circuit 91 can be formed. In the example shown in FIG. 7, bonding pads 93a to 93f are formed on the semiconductor chip 95.

Figure 8:
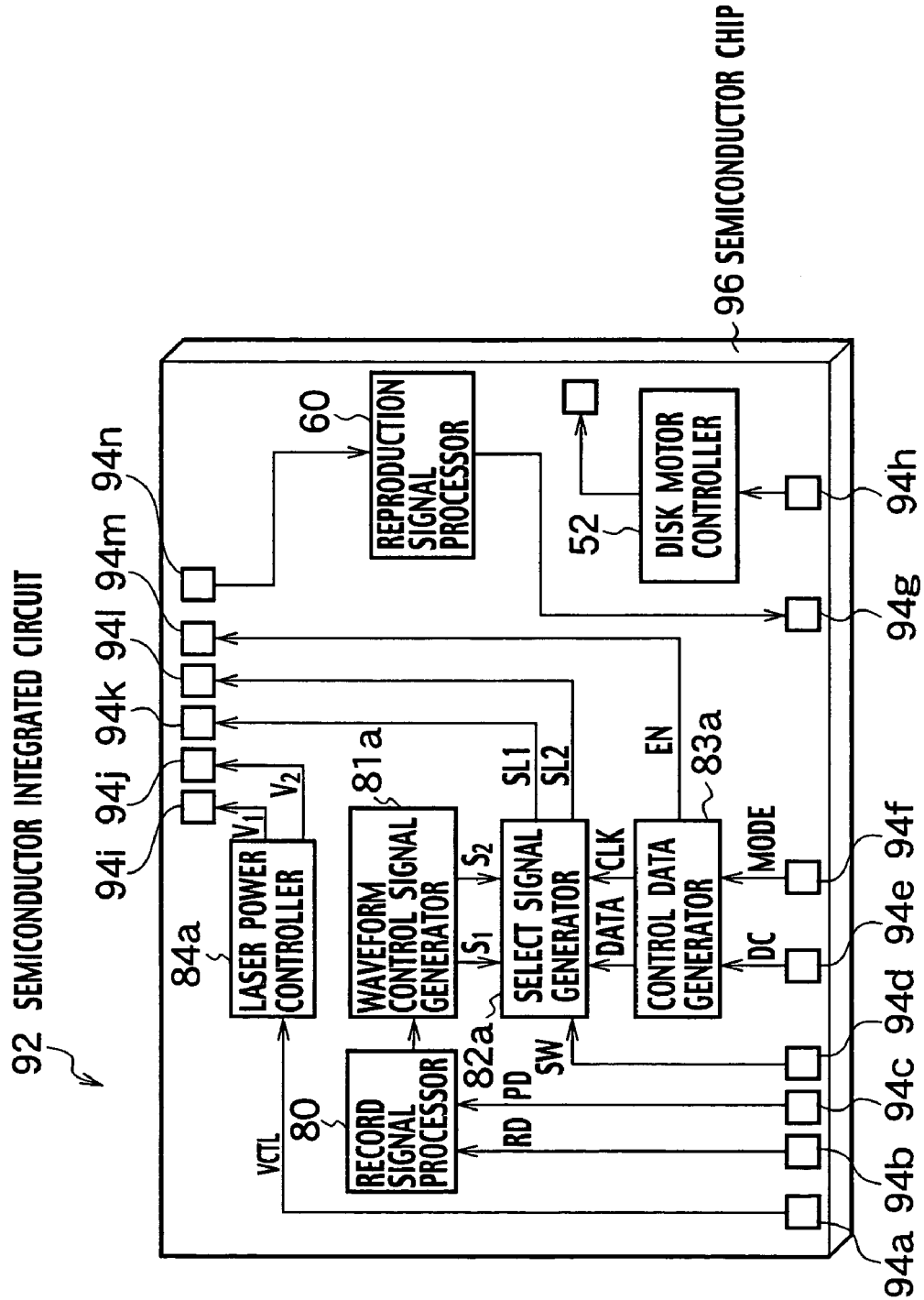
FIG. 8 is a schematic diagram showing a semiconductor integrated circuit according to the first embodiment.

The laser power controller 84a, the record signal processor 80, the waveform control signal generator 81a, the select signal generator 82a, the control data generator 83a, the reproduction signal processor 60, and the disk motor controller 52 shown in FIG. 1 can be monolithically integrated onto a single semiconductor chip 96, as shown in FIG. 8, and a semiconductor integrated circuit 92 can be formed. In the example shown in FIG. 8, bonding pads 94a to 94n are formed on the semiconductor chip 96.

(First Modification of First Embodiment)

Figure 9:
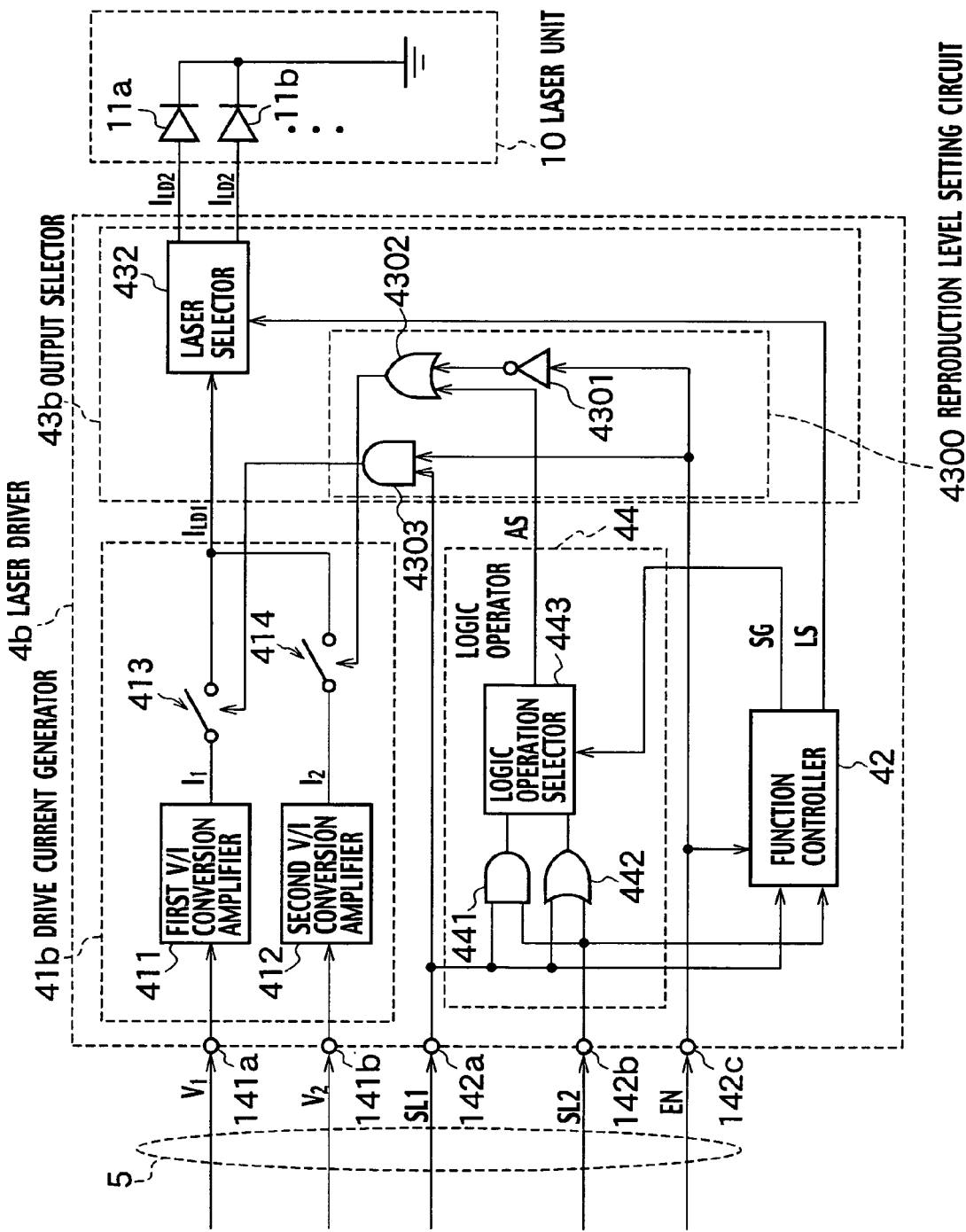
FIG. 9 is a block diagram showing a laser driver according to a first modification of the first embodiment.

As shown in FIG. 9, an output selector 43b may include reproduction level setting circuit 4300 configured to set the drive current $I_{LD2}$ to a reproduction level as a laser driver 4b according to a first modification of the first embodiment. The reproduction level setting circuit 4300 includes a level controlling inverter 4301, a level controlling OR circuit 4302, and a level controlling AND circuit 4303. The level controlling inverter 4301 is connected between the enable signal terminal 142c and the level controlling OR circuit 4302. The level controlling OR circuit 4302 has an input connected to the logic operation selector 443, and an output connected to the second switch 414. The level controlling AND circuit 4303 has an input connected to the enable signal terminal 142c and the first select signal terminal 142a, and an output connected to the first switch 413.

The level controlling inverter 4301 inverts the output enable signal EN. The level controlling OR circuit 4302 executes an OR operation to the inverted output enable signal EN and the operation output signal AS, and controls the second switch 414. The level controlling AND circuit 4303 executes an AND operation to the first select signal SL1 and the output enable signal EN, and controls the first switch 413.

As a result, when the output enable signal EN is a low level signal, the first switch 413 goes to an off state, and the second switch 414 goes to an on state. Therefore, it is possible to set the drive current $I_{LD2}$ to the reproduction level by setting the voltage value of the second current setting signal $V_2$ to the reproduction level. As described above, according to the laser driver 4b shown in FIG. 9, it is possible to set the drive current $I_{LD2}$ to a fixed value.

(Second Modification of First Embodiment)

Figure 10:
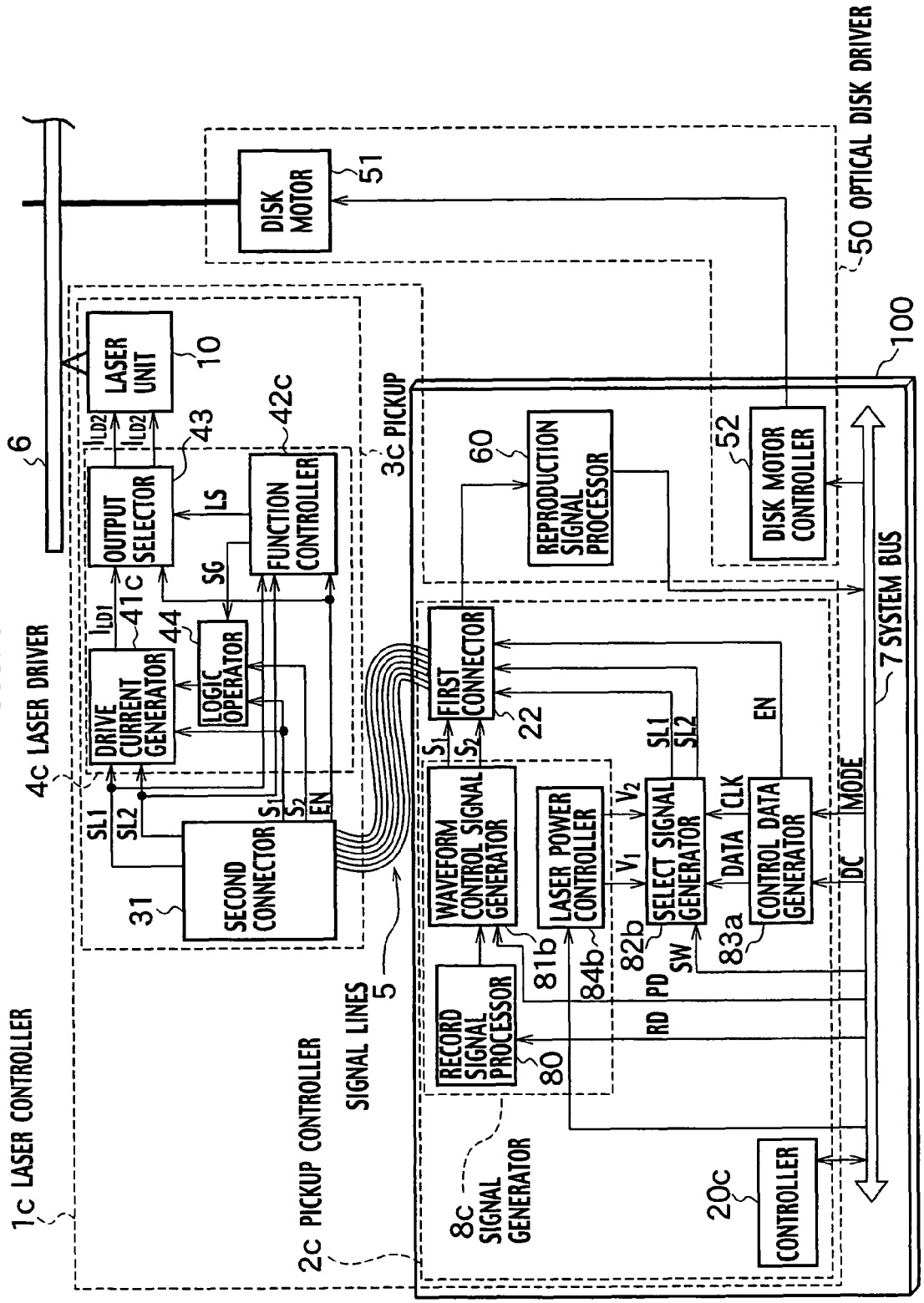
FIG. 10 is a block diagram showing an optical disk driving unit according to a second modification of the first embodiment.

As shown in FIG. 10, a laser power controller 84b may be connected to a select signal generator 82b as an optical disk driving unit according to a second modification of the first embodiment. The select signal generator 82b selects one of the first current setting signal $V_1$ and the control data DATA as the first select signal SL1, and selects one of the second current setting signal $V_2$ and the data transfer clock CLK as the second select signal SL2, based on the switch signal SW. The first select signal SL1 and the second select signal SL2 are transmitted to the drive current generator 41c and the function controller 42c via the first connector 22, the signal lines 5, and the second connector 31.

The first waveform control signal $S_1$ generated by the waveform control signal generator 81b is transmitted to the drive current generator 41c and the logic operator 44 via the first connector 22, the signal lines 5, and the second connector 31. The second waveform control signal $S_2$ is transmitted to the logic operator 44 via the first connector 22, the signal lines 5, and the second connector 31. According to the optical disk driving unit shown in FIG. 10, it is possible to deal with the increase in functions of pickup 3c without increasing the number of signal lines 5 in the flexible-cable.

(Third Modification of First Embodiment)

Figure 11:
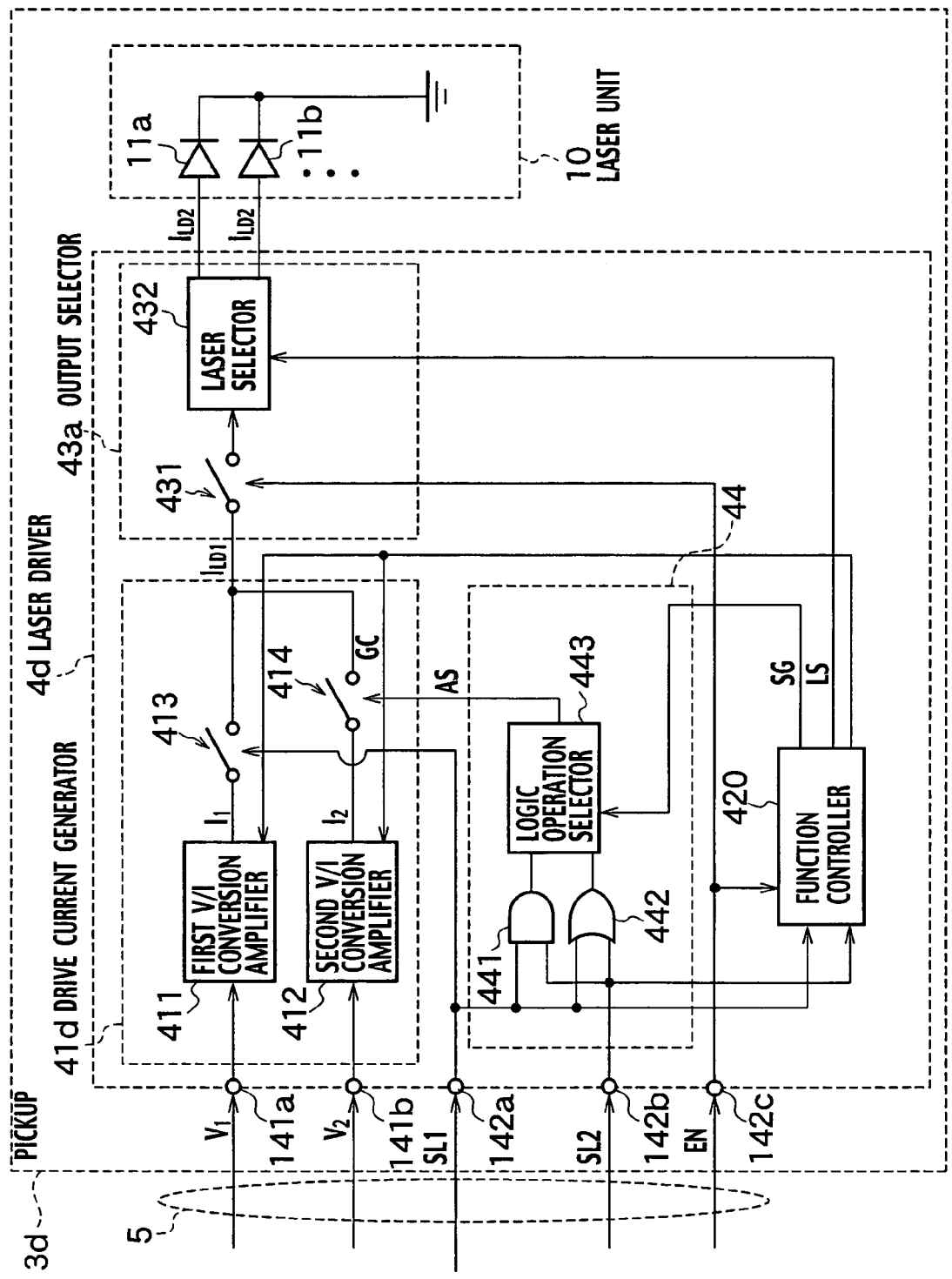
FIG. 11 is a block diagram showing a laser driver according to a third modification of the first embodiment.

As shown in FIG. 11, function controller 420 may further control the gain of the drive current generator 41d as a pickup 3d according to a third modification of the first embodiment. The function controller 420 supplies a gain control signal GC to the first V/I conversion amplifier 411 and the second V/I conversion amplifier 412. According to the pickup 3d shown in FIG. 11, it is possible to increase the gain of the drive current generator 41d in a high-speed recording mode.

Second Embodiment

Figure 12:
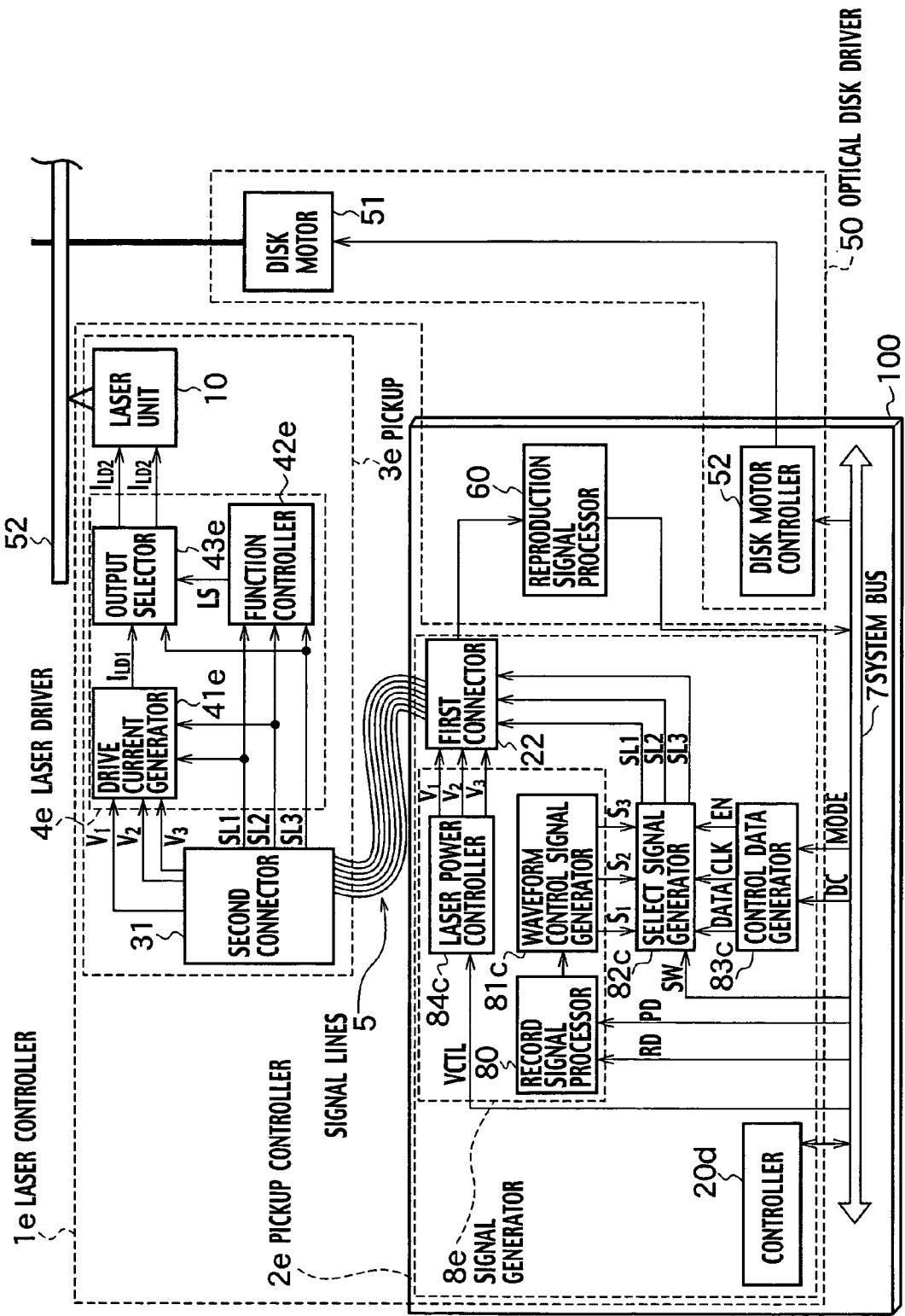
FIG. 12 is a schematic diagram showing an optical disk driving unit according to a second embodiment of the present invention.

As shown in FIG. 12, an optical disk driving unit according to a second embodiment of the present invention is different from FIG. 1 in that the waveform control signal generator 81c further generates a third waveform control signal $S_3$. The control data generator 83c supplies the output enable signal EN to the select signal generator 82c. The select signal generator 82c further generates a third select signal SL3. The laser power controller 84c further generates a third current setting signal $V_3$. The laser driver 4e shown in FIG. 12 does not include the logic operator 44 shown in FIG. 1. Other configurations are similar to the optical disk driving unit shown in FIG. 1. The laser driver 4e and the pickup controller 2e can be monolithically integrated so as to form a semiconductor integrated circuit onto an individual semiconductor chip, the as same as FIG. 7 and FIG. 8.

Figure 13:
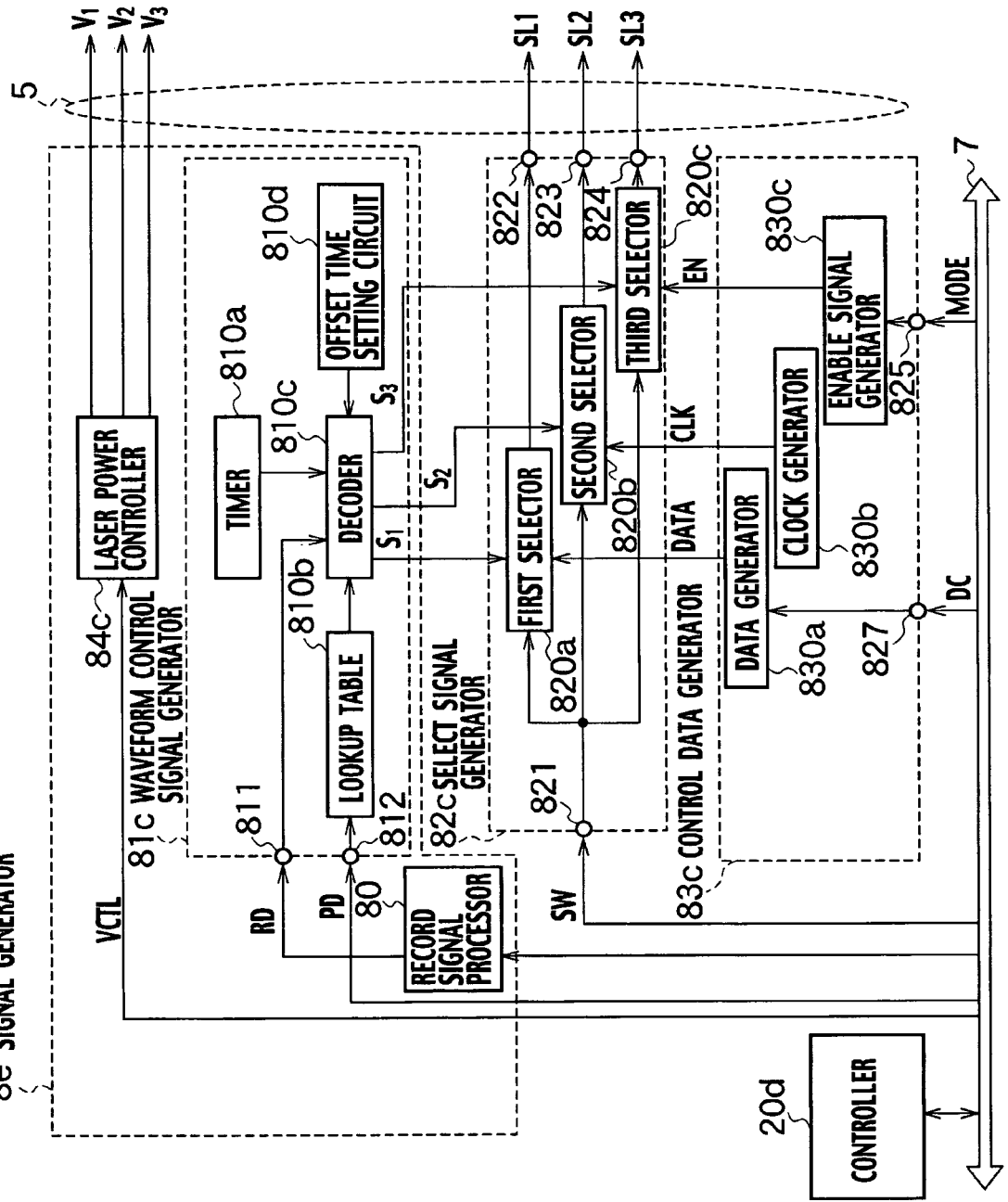
FIG. 13 is a block diagram showing a signal generator, a select signal generator, and a control data generator according to the second embodiment.

As shown in FIG. 13, the select signal generator 82c further includes a third selector 820c having an input connected to the operation switch signal input terminal 821, the decoder 810c, and the enable signal generator 830c, and an output connected to a third select signal output terminal 824. The third selector 820c selects one of the third waveform control signal $S_3$ generated by the decoder 810c and the output enable signal EN generated by the enable signal generator 830c as the third select signal SL3.

Figure 14:
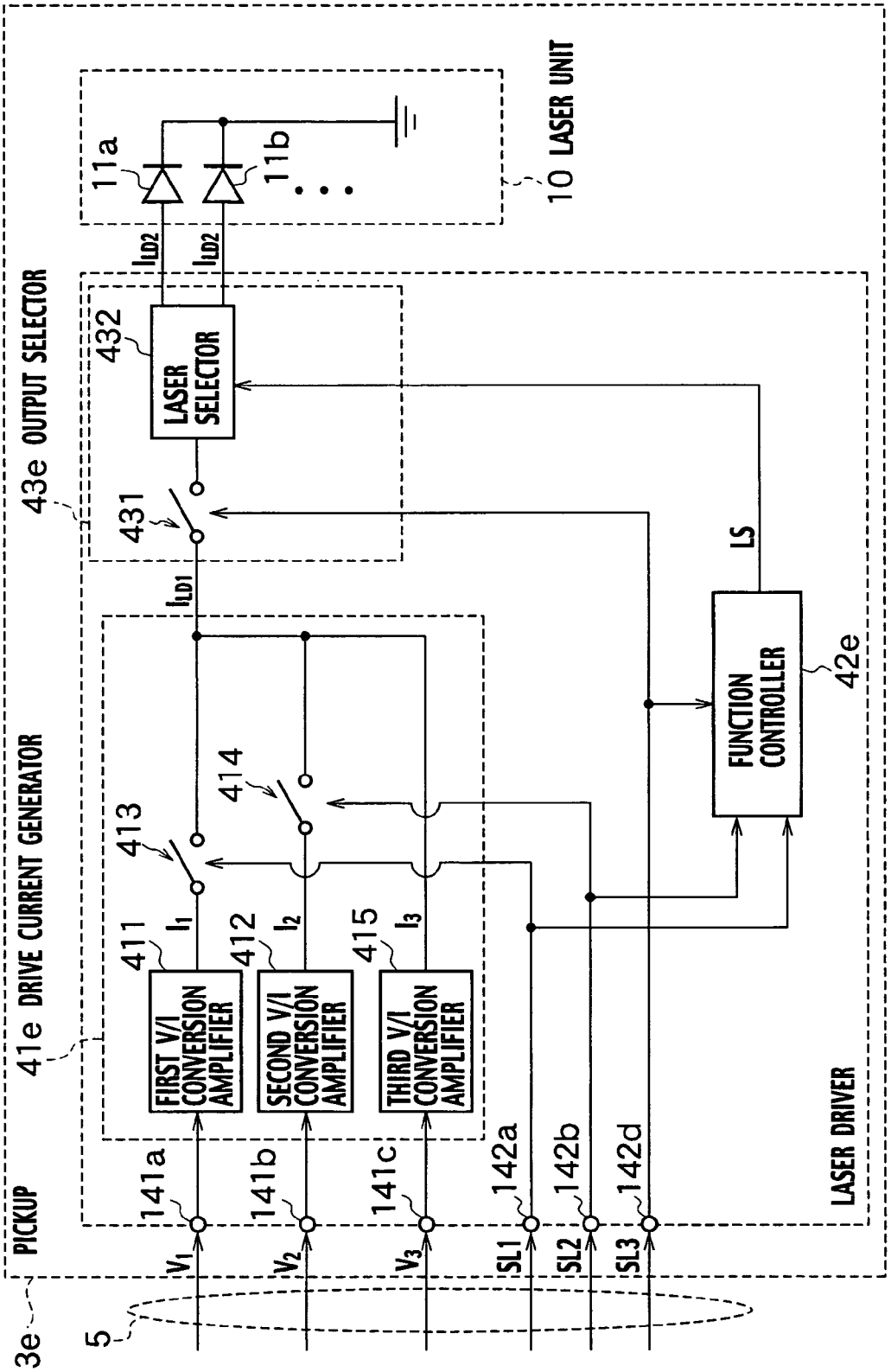
FIG. 14 is a block diagram showing a laser driver according to the second embodiment.

As shown in FIG. 14, the drive current generator 41e further includes a third V/I conversion amplifier 415 having an input connected to a third current setting signal terminal 141c, and an output connected to the output switch 431. The third V/I conversion amplifier 415 provides a V/I conversion to the third current setting signal $V_3$, and generates a third current $I_3$.

As shown in FIG. 15, the function controller 42e does not generate the logic operation select signal SG shown in FIG. 4.

Next, the operation of the laser controller 1e according to the second embodiment will be described referring to FIG. 12 to FIG. 16D. Repeated descriptions for the same operations according to the second embodiment which are the same as the first embodiment are omitted.

(A) At time t1 of FIG. 16, the first selector 820a shown in FIG. 13 selects the control data DATA as the first select signal SL1 based on the switch signal SW. The second selector 820b selects the data transfer clock CLK as the second select signal SL2. The third selector 820c selects the output enable signal EN as the third select signal SL3. The enable signal generator 830c generates a low level output enable signal EN. The laser power controller 84c generates the first current setting signal $V_1$, the second current setting signal $V_2$, and the third current setting signal $V_3$. The first V/I conversion amplifier 411, the second V/I conversion amplifier 412, and the third V/I conversion amplifier 415 shown in FIG. 14 provide V/I conversion to the first current setting signal $V_1$, the second current setting signal $V_2$, and the third current setting signal $V_3$, respectively. As a result, the first current $I_1$, the second current $I_2$, and the third current $I_3$ are generated.

(B) In a period of time t1 to t2 of FIG. 16A, the data generator 830a generates the control data DATA. The control data DATA is transmitted to the data input terminal Din of the shift register 4230 shown in FIG. 15 as the first select signal SL1. At time t2 of FIG. 16B, the data transfer clock CLK is set to a high level. The data transfer clock CLK is transmitted to the function controlling AND circuit 422 shown in FIG. 15 as the second select signal SL2. Since the third select signal SL3 is a low level signal at time t2 of FIG. 16, the function controlling AND circuit 422 supplies the second select signal SL2 to the clock terminal CK of the shift register 4230. As shown in FIG. 16D, the shift register 4230 holds the first select signal SL1 in synchronization with the leading edge of second select signal SL2. The held first select signal SL1 is supplied to the laser selector 432 shown in FIG. 14.

(C) At time t3 of FIG. 16, the enable signal generator 830c sets the output enable signal EN to a high level. As a result, third select signal SL3 is set to a high level at time t3 of FIG. 16C. When the third select signal SL3 is set to a high level, the output switch 431 shown in FIG. 14 goes to an on state. As a result, the third current $I_3$ is supplied to the laser unit 10 as the drive current $I_{LD2}$. The pickup 3e traces the optical disk 6, and searches for a recording start position during period of time t3 to t4 of FIG. 16.

(D) At time t4 of FIG. 16, the first select signal SL1 and the second select signal SL2 are set to a high level. When the first select signal SL1 and the second select signal SL2 are set to a high level, the first switch 413 and the second switch 414 shown in FIG. 14 go to an on state. As a result, the laser beam emitted by the laser unit 10 goes to a maximum power level. In the period after time t4 of FIG. 16, i.e., in the recording mode, the state of the function controller 42e shown in FIG. 15 is not changed by the first select signal SL1 and the second select signal SL2. Therefore, the combination of a high level first select signal SL1 and a low level second select signal SL2 is not generated as shown in FIG. 16A and FIG. 16B.

As described above, according to the second embodiment, it is not necessary to add exclusive signal line to the signal lines 5 for transmitting the output enable signal EN because the select signal generator 82c selects one of the third waveform control signal $S_3$ and the output enable signal EN as the third select signal SL3. Therefore, it is possible to prevent an increase in the implementation area and a decrease in reliability of the first connector 22 and the second connector 31.

Third Embodiment

Figure 17:
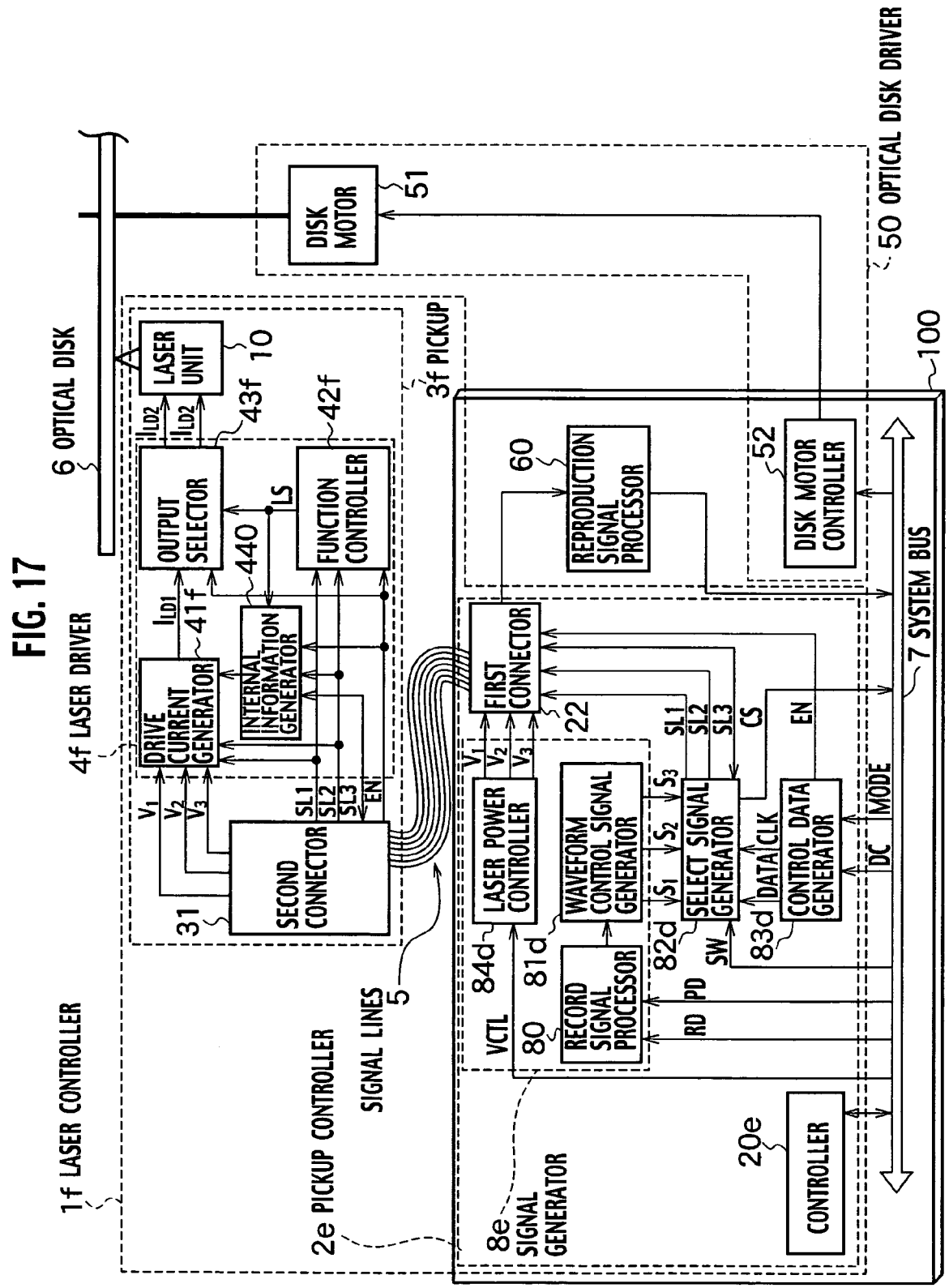
FIG. 17 is a schematic diagram showing an optical disk driving unit according to a third embodiment of the present invention.

As shown in FIG. 17, an optical disk driving unit according to a third embodiment of the present invention is different from FIG. 1 in that a laser driver 4f further includes an internal information generator 440 configured to detect a data transfer error of the control data DATA. For example, the internal information generator 440 calculates a check sum of the laser select signal LS, and transmits an error detection signal CS to the select signal generator 82d as the third select signal SL3. Other configurations are similar to the optical disk driving unit shown in FIG. 1 and FIG. 12.

Figure 18:
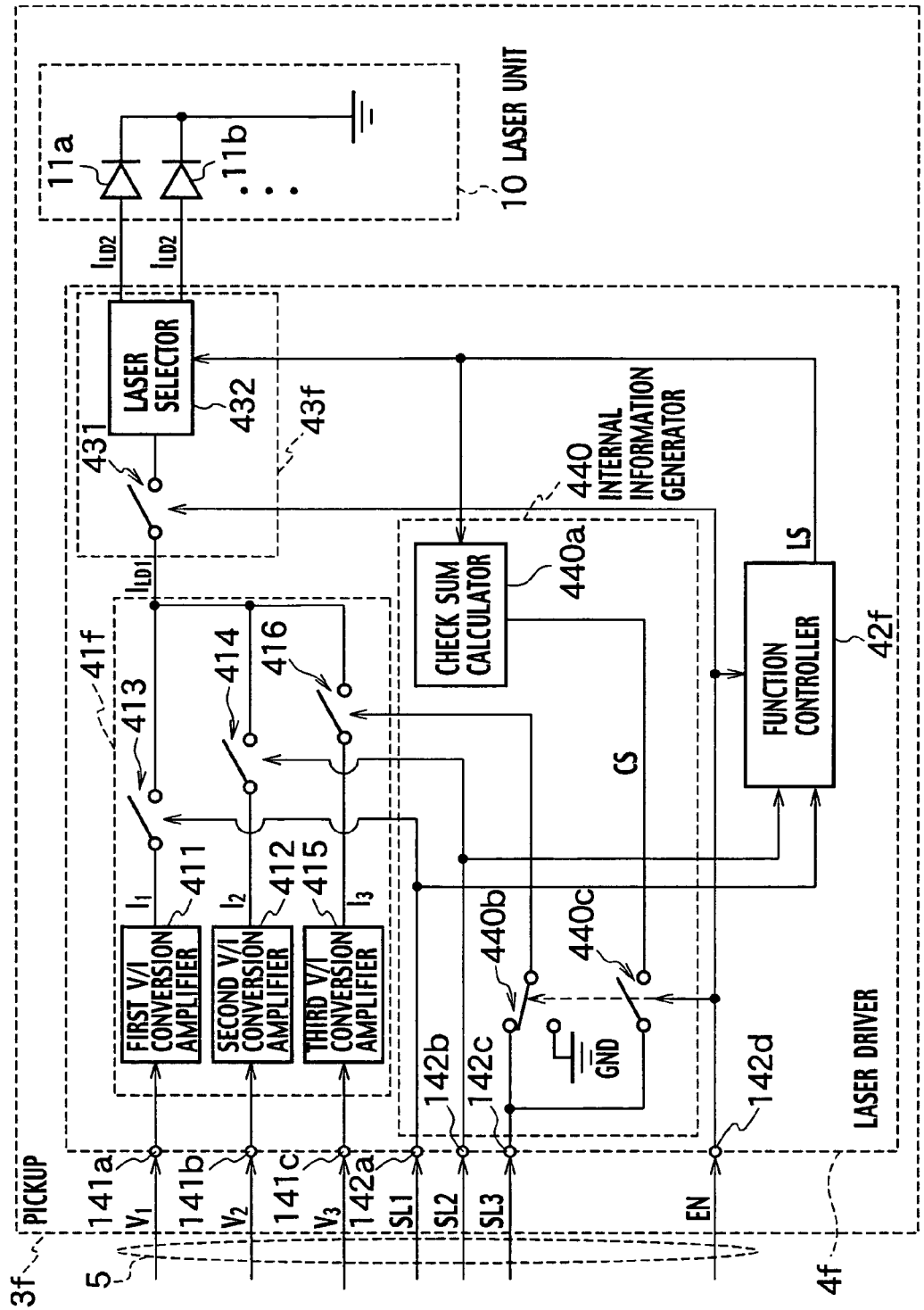
FIG. 18 is a schematic diagram showing a laser driver according to the third embodiment.

As shown in FIG. 18, the internal information generator 440 includes a check sum calculator 440a, a third select signal switch 440b, and a detection signal switch 440c. The check sum calculator 440a is connected to between the function controller 42f and the detection signal switch 440c. The third select signal switch 440b has an input connected to the third select signal terminal 142c and the enable signal terminal 142d, and an output connected to the third switch 416. The detection signal switch 440c has an input connected to the check sum calculator 440a and the enable signal terminal 142d, and an output connected to the third select signal terminal 142c.

The check sum calculator 440a calculates the check sum of the laser select signal LS, and generates the error detection signal CS. The third select signal switch 440b switches supply of the third select signal SL3 to the third switch 416 based on the output enable signal EN. The detection signal switch 440c switches supply of error detection signal CS to the third select signal terminal 42c based on the output enable signal EN.

Figure 19:
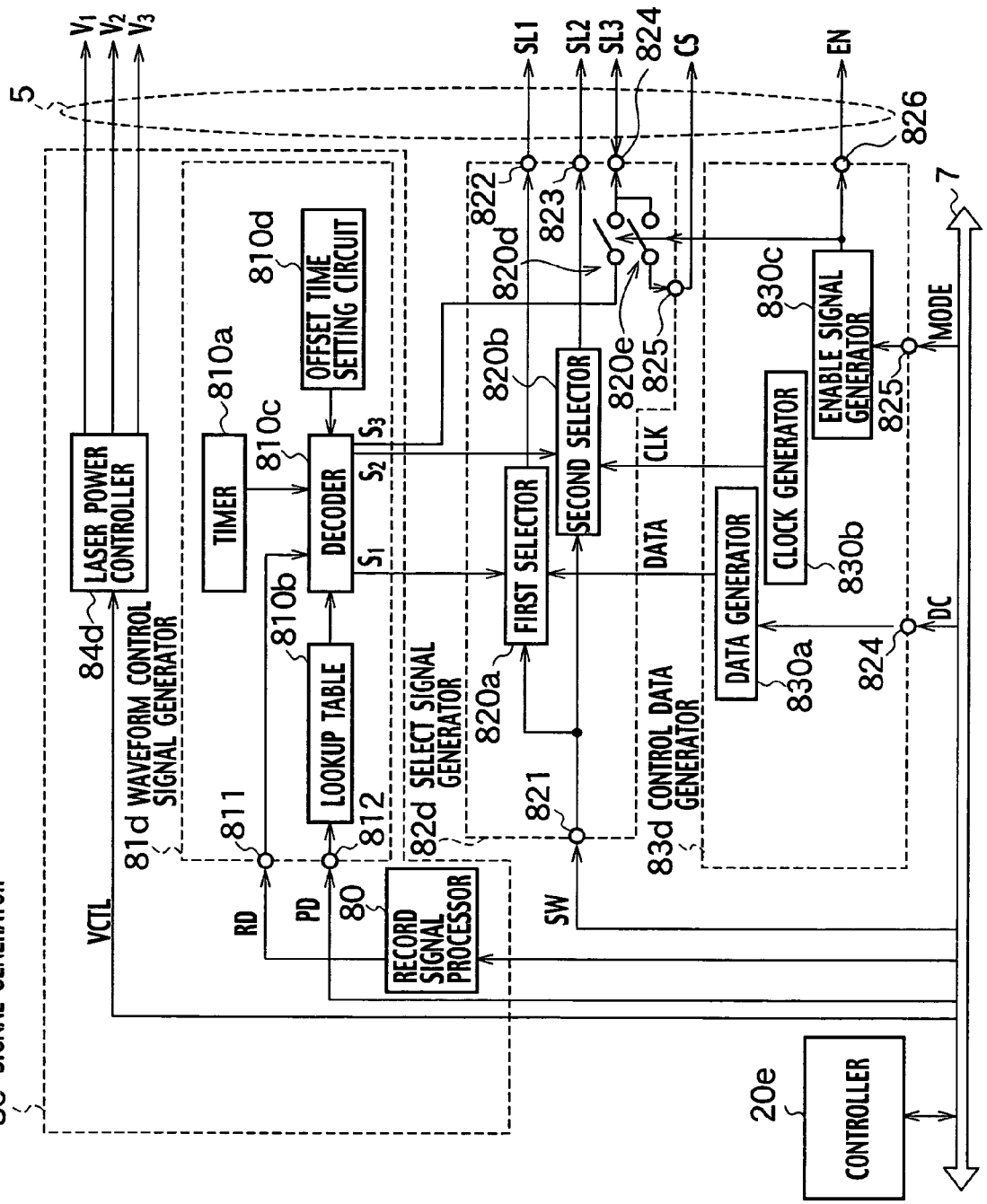
FIG. 19 is a schematic diagram showing a signal generator, a select signal generator, and a control data generator according to the third embodiment.
Figure 20:
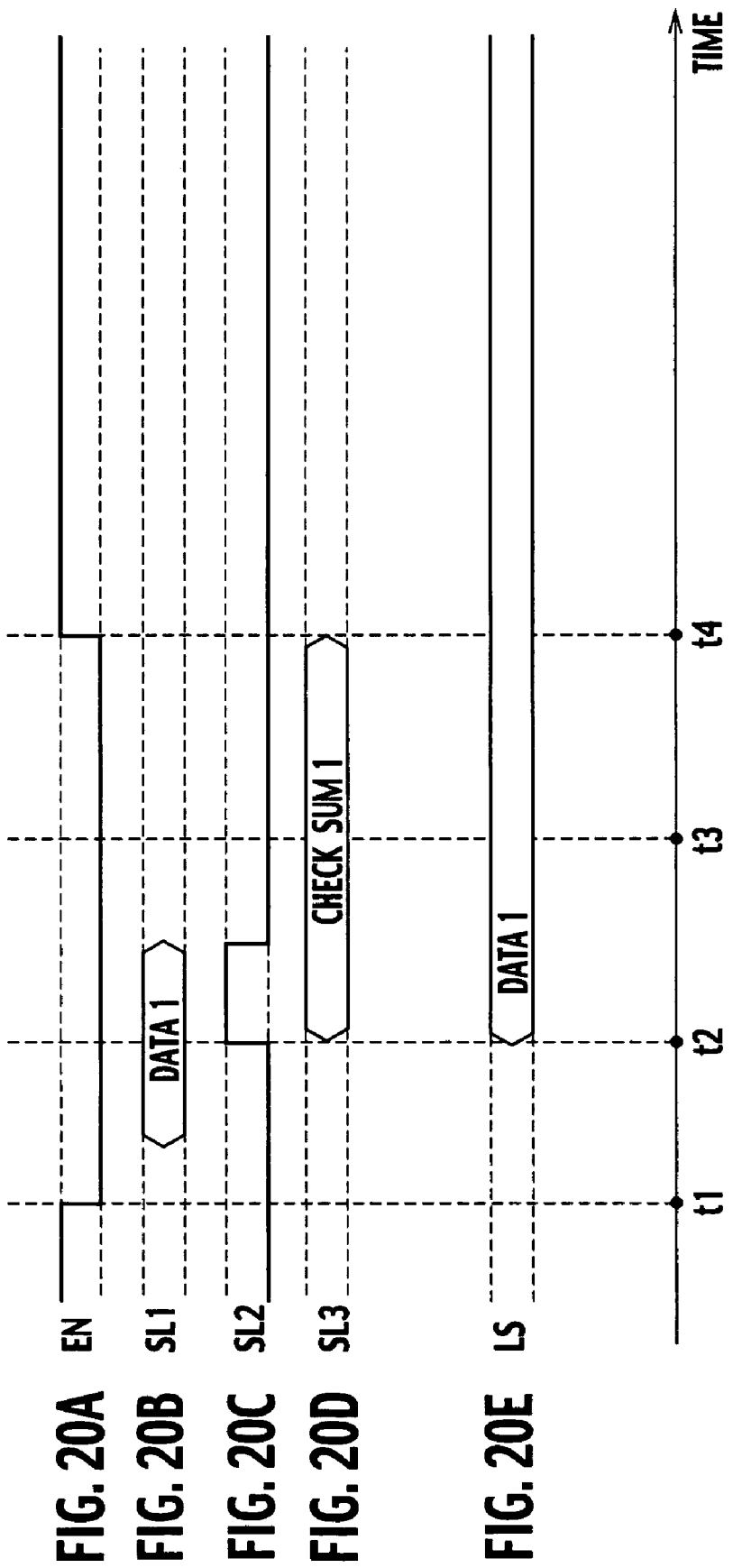
FIGS. 20A to 20E are time charts showing the operation of the laser controller according to the third embodiment.

As shown in FIG. 19, the select signal generator 82d further includes a waveform control signal switch 820d and a third select signal input switch 820e. The third select signal output switch 820d switches supply of the third waveform control signal $S_3$ to the pickup 3f based on the output enable signal EN. The third select signal input switch 820e switches supply of the third select signal SL3 generated by the internal information generator 440 shown in FIG. 18 to the controller 20e. The data generator 830a previously calculates a sum value of the control data DATA, and adds the sum value to the control data DATA.

The third select signal switch 440b shown in FIG. 18 and the waveform control signal switch 820d are turned on by a high-level output enable signal EN. That is, the third select signal switch 440b and the waveform control signal switch 820d go to an on state in the recording mode. On the other hand, the detection signal switch 440c shown in FIG. 18 and the third select signal input switch 820e are turned on by a low level output enable signal EN. That is, the third select signal input switch 820e and the detection signal switch 440c go to an on state in the stand-by mode or the reproduction mode.

Next, the operation of the laser controller If according to the third embodiment will be described referring to FIG. 17 to FIG. 20E. Repeated descriptions for the same operations according to the third embodiment which are the same as the first embodiment are omitted.

(A) At time t1 of FIG. 20A, the output enable signal EN is set to a low level. When the output enable signal EN is set to a low level, the detection signal switch 440c shown in FIG. 18 and the third select signal input switch 820e shown in FIG. 19 go to an on state.

(B) In a period of time t1 to t2 shown in FIG. 20A, the control data DATA generated by the data generator 830a is transmitted to the function controller 42f shown in FIG. 18 as the first select signal SL1. At time t2 of FIG. 20C, the data transfer clock CLK is set to a high level. When the data transfer clock CLK is set to a high level, the laser select signal LS is generated at time t2 of FIG. 20E.

(C) The check sum calculator 440a shown in FIG. 18 checks whether there are errors in the laser select signal LS. For example, the check sum calculator 440a calculates the sum value of the laser select signal LS, and compares each sum value calculated by the data generator 830a and the check sum calculator 440a. As shown in FIG. 20D, the check sum calculator 440a generates the error detection signal CS based on the comparison. The data generator 830a transmits the control data DATA again when the error detection signal CS is generated.

(D) At time t4 of FIG. 20A, the detection signal switch 440c shown in FIG. 18 and the third select signal input switch 820e shown in FIG. 19 go to an off state when the output enable signal EN is set to a high level.

As described above, according to third embodiment, it is possible to detect a data transfer error of the control data DATA. The check sum calculator 440a may directly calculate the check sum from the control data DATA supplied to the function controller 42f without calculating the check sum from the laser select signal LS.

(Modification of Third Embodiment)

Figure 21:
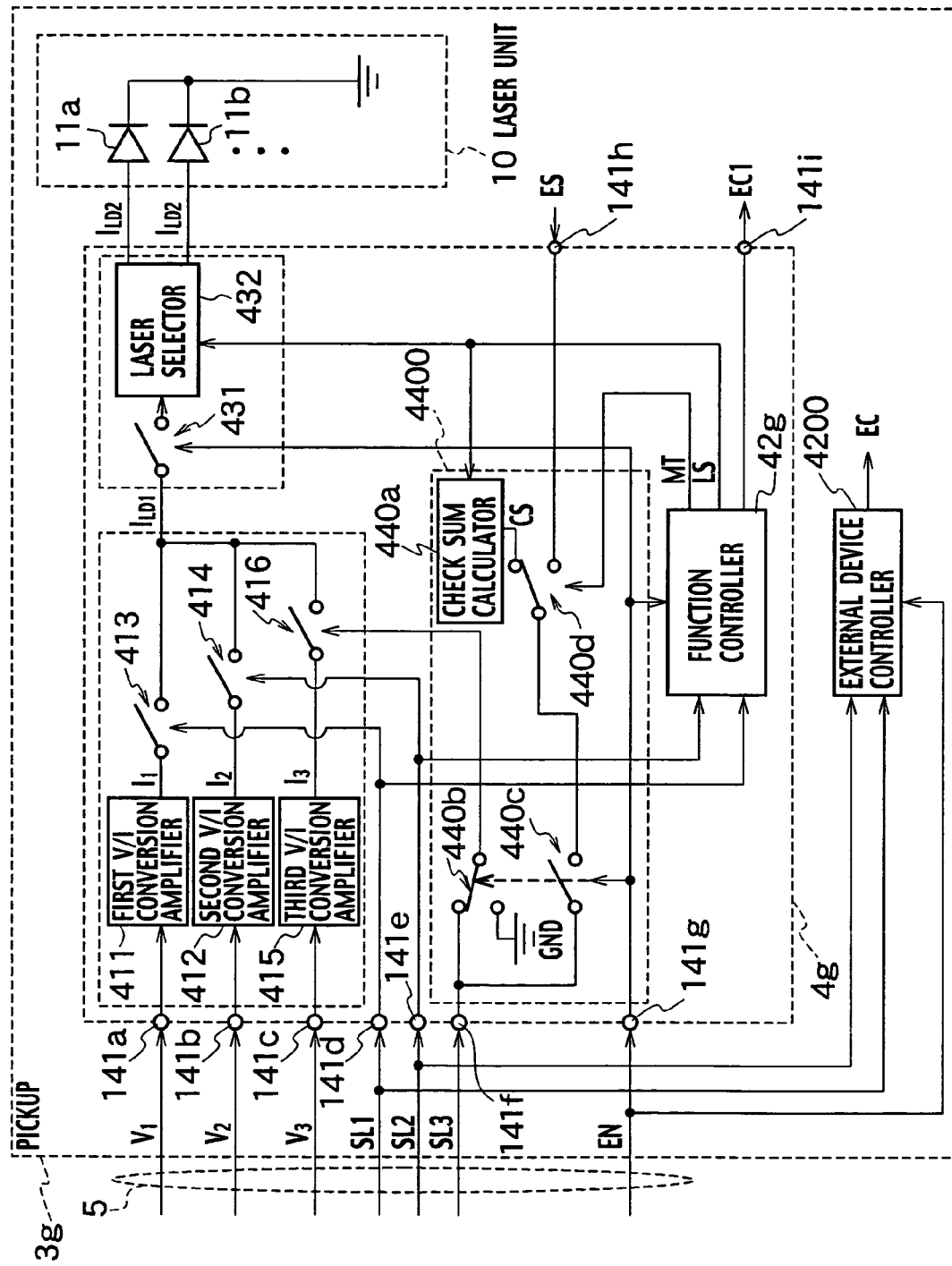
FIG. 21 is a schematic diagram showing a laser driver according to a modification of the third embodiment.

As shown in FIG. 21, the pickup 3g may further include an external device controller 4200 configured to control external devices of laser driver 4g as a modification of the third embodiment. The external device controller 4200 generates and external device control signal EC based on the first select signal SL1, the second select signal SL2, and the output enable signal EN.

The function controller 42g further generates an internal information select signal MT. The internal information generator 4400 further includes an internal information select switch 440d configured to supply one of a external information ES generated by the external devices and the error detection signal CS to the detection signal switch 440c based on the internal information select signal MT. According to the pickup 3g shown in FIG. 21, it is possible to control not only internal of the laser driver 4g but also the external devices of the laser driver 4g.

Other Embodiments

Various modifications will become possible for those skilled in the art after receiving the teachings of the present disclosure without departing from the scope thereof.

The aforementioned first embodiment have been described by way of example in which the control data DATA is transferred serially in the stand-by mode. With respect to the first modification of the first embodiment, the control data DATA is transferred serially in the reproduction mode. However, the control data DATA may be transferred serially in either the reproduction mode or the reproduction mode.

Furthermore, the control data DATA may be transferred parallel when the current setting signals $V_1$, $V_2$, . . . and waveform control signals $S_1$, $S_2$, . . . are increased.

When the functions of the pickup are increased, it is possible to deal with the increase in the functions by increasing the number of the stages in the shift register 423 shown in FIG. 4.

The aforementioned first to third embodiments have been described by way of example in which the waveform control signal generator 81d includes the decoder 810c. However, the waveform control signal generator 81d may include a plurality of pulse generators corresponding to the waveform control signal $S_1$, $S_2$, . . . instead of the decoder 810c.

The aforementioned third embodiment have been described by way of example in which the internal information generator 440 includes the third select signal switch 440b and the detection signal switch 440c. However, it is possible to eliminate the third select signal switch 440b and the detection signal switch 440c by including a sequencer operating in synchronization with the data transfer clock CLK.

What is claimed is:

1. An optical disk driving unit comprising:
    a pickup configured to supply a drive current to a laser unit, and to irradiate a laser beam to an optical disk;
    a plurality of first signal lines configured to transmit a plurality of current setting signals for setting current value of the drive current to the pickup;
    a plurality of second signal lines configured to transmit a plurality of waveform control signals for controlling waveform of the drive current to the pickup; and
    a pickup controller configured to transfer, to the pickup via the second signal lines, control data for controlling function of the pickup instead of the waveform control signals when the drive current is a constant value;
    wherein the pickup controller supplies a plurality of current setting signals and a plurality of waveform control signals to generate the drive current as the control information to the pickup in a recording mode, said pickup controller comprising,
    a signal generator configured to generate first and second current setting signals as the current setting signals, and to generate a first waveform control signal and a second waveform control signal for masking the first waveform control signal as the waveform control signals,
    a control data generator configured to generate the control data, a data transfer clock, and an output enable signal to indicate generation of the drive current and
    a select signal generator configured to select one of the first waveform control signal and the control data as a first select signal, and to select one of the second waveform control signal and the data transfer clock as a second select signal.

2. The driving unit of claim 1, wherein the pickup comprises:
    a function controller configured to generate a logic operation select signal and a laser select signal based on the first select signal, the second select signal, and the output enable signal;
    a logic operator configured to execute one of an AND operation and an OR operation to the first and second select signals in accordance with the logic operation select signal, and to generate an operation output signal; and
    a drive current generator configured to generate the drive current based on the first and second current setting signals, the first select signal, and the operation output signal.

* * * * *